Nov. 22, 1955  S. SNIDER  2,724,365
CONTINUOUS FLOW FOUNTAIN
Filed Feb. 12, 1951
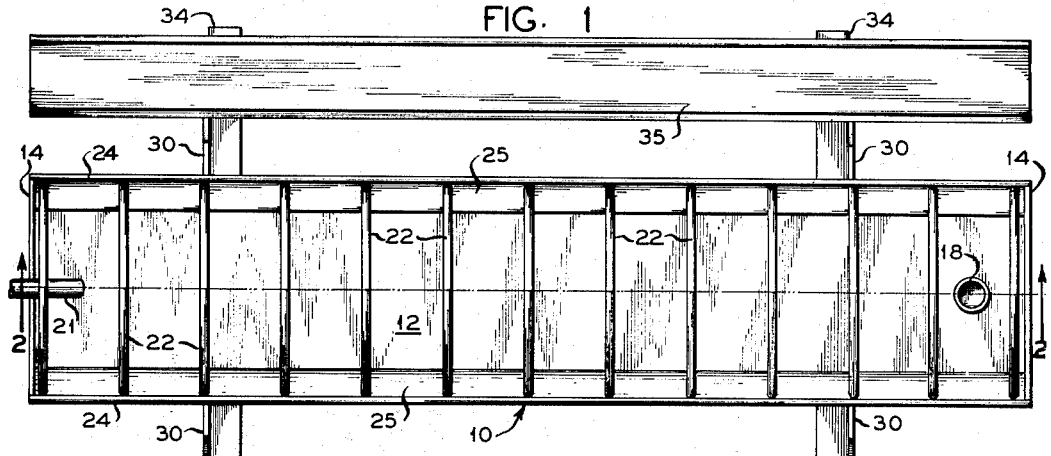
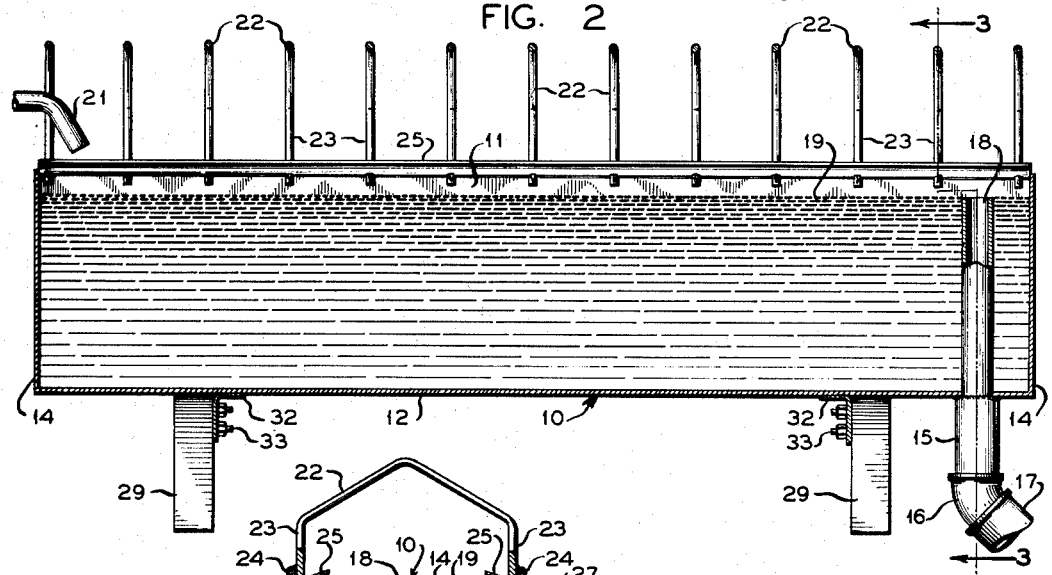
*INVENTOR.*
STEWART SNIDER
BY
A. Yates Dowell
ATTORNEY

United States Patent Office 2,724,365
Patented Nov. 22, 1955

2,724,365

CONTINUOUS FLOW FOUNTAIN

Stewart Snider, Washington Township, Franklin County, Pa.

Application February 12, 1951, Serial No. 210,445

10 Claims. (Cl. 119—74)

This invention relates to the care of livestock and more particularly to a water fountain for providing a supply of drinking water convenient to both large and small animals such as horses, cattle, sheep and goats as well as for all kinds of fowl.

Heretofore many types of watering devices have been proposed and utilized ranging from a common open tub filled manually to relatively costly complicated devices usually incorporating a trough or the like, as well as some flow control means such as a float controlled valve. These complicated devices have possessed numerous disadvantages such as failure of operation in freezing weather, interference with the mechanism by animals using the same and difficulty in maintaining the same in a sanitary condition due to the complicated mechanism and inaccessibility for cleaning. Likewise, many of the prior art devices have been difficult to maintain in a sanitary condition due to the fact that the receptacles or troughs often presented sharp internal corners which are difficult to clean and also many of these were relatively unstable which permitted easy upsetting of the same by the animals they were intended to serve.

Many of these prior art watering devices were also entirely unsuitable for use by both large and small animals as well as fowl, since they were either disposed directly on the ground or were supported on upright supporting means which made no provision whatever for the use of the same by widely varying sizes of animals. Draining of the prior art devices of this type was often difficult due to the failure to provide a suitable drain and in many instances it was necessary to dip the water therefrom manually in order to permit adequate cleaning of the interior.

It is therefore an object of this invention to provide a watering fountain for livestock of rugged construction and one which is supported at a convenient height for use thereof by relatively large animals and at the same time provide means for supporting small animals or fowl while drinking therefrom.

It is a further object of the invention to provide a watering fountain adapted to receive a continuous supply of water there being overflow means to maintain the water level at a predetermined point and in which the fountain may be conveniently and quickly drained to permit the efficient cleaning of the interior thereof.

It is a further object of the invention to provide a watering fountain having means to prevent contamination of the water therein by preventing the animals or fowl using the same from immersing more than the mouth into the water.

It is a further object of the invention to provide a watering fountain for livestock which may be economically constructed from readily available structural shapes and materials and which requires substantially no skilled labor in the manufacture thereof and which may therefore be sold in a highly competitive market.

Further objects and advantages of the invention will be apparent from the following description taken in conjunction with the accompanying drawings, wherein:

Figure 1 is a top plan view of the watering fountain of this invention;

Fig. 2, a longitudinal sectional view on the line 2—2 of Fig. 1; and

Fig. 3, a sectional view on the line 3—3 of Fig. 2 showing the particular arrangement of the overflow and draining means.

With continued reference to the drawing, there is shown an elongated trough-like receptacle 10 having upstanding spaced side walls 11 connected to a bottom wall 12 by inclined intermediate side walls 13. The provision of the inclined intermediate side walls 13 eliminate the existence of relatively sharp corners within the receptacle thereby materially facilitating the cleaning of the same to maintain the trough in a sanitary condition. End walls 14 are also provided which may be attached to the side walls, 11, bottom wall 12, and intermediate side walls 13 by welding or the like.

The receptacle 10 is provided with an outlet adjacent one end thereof in the form of a nipple 15 which, as best shown in Fig. 3, may be attached to the bottom wall 12 of the receptacle 10 by welding or, if desired, the nipple 15 might be secured in place by providing a threaded flange coupling on the bottom wall 12. The nipple 15 communicates by suitable fittings 16 with a permanent drain 17 which serves to conduct the waste water away from the fountain.

The water level within the receptacle 10 is maintained constantly by means of an overflow pipe 18 which may be threadedly received in the nipple 15 and extend upwardly within the receptacle 10 to a point corresponding with the desired water level. As shown in Fig. 3, the water level is maintained at a line 19, any excess water flowing over the top of pipe 18 and therethrough into the drain 17. Obviously, the pipe 18 may be provided in any desired length to maintain a corresponding water level.

As stated above, the connection between pipe 18 and the nipple 15 may comprise screw threads, as shown at 20, or the threads may be omitted in order to permit the convenient and easy removal of the pipe 18. When it is desired to clean the receptacle 10, it is only necessary to remove the pipe 18 from the nipple 15 either by rotating the same to release the threads 20 or by withdrawing the same by a twisting and pulling motion, provided a tapered frictional joint is utilized, at which time the water in the receptacle 10 will flow outwardly through the nipple 15 and drain 17 to completely empty the same. Water may be supplied to the receptacle 10 in any desired manner, there being shown a pipe 21 connected to any suitable source and terminating above the level of the water in the receptacle pipe 21 being located at the opposite end of the receptacle from the drain 17 in order to provide a constant flow through the receptacle thus tending to remove dirt or other debris therefrom by the continuous movement of the water.

Since animals and fowl have often had a tendency to attempt to immerse a large portion of their bodies in a watering fountain and since it is highly desirable to preclude such action which often results in damage to the fountain, injury to the animals, and the disposition of unnecessary quantities of dirt or other foreign matter in the fountain, means has been provided in the form of a series of upstanding guard members 22 which, as shown, are formed of metallic rods spaced a sufficient distance apart longitudinally of the receptacle 10 to permit the convenient immersion of the mouth of the animal or fowl and preclude the entrance of any further portion of the body.

Guards 22 are of generally inverted V-shape and the downwardly extending legs 23 thereof are fixed to longitudinally extending bars or rods 24 by welding or the like which serve to secure the guards 22 together into a single easily handled unit. The legs 23 of the end guards 22 are somewhat longer than the legs of the intermediate guards and these extend downwardly through apertures 23' provided in an inwardly extending lip 25 on the upper edges of the upright side walls 11 of the receptacle 10, there being provided apertures 26 in the lower ends of the legs 23 of the end guards 22 for the reception of cotter pins 27 or other suitable fastening means, these pins being inserted through an aperture 28 in the upstanding side walls 11 of the receptacle 10.

It will thus be seen that in order to clean the receptacle 10, it is only necessary to withdraw the cotter pins 27 from the legs 23, at which time the guards 22 may be removed as a unit and placed aside to permit the convenient access to the receptacle. The guards 22 are of relatively rigid material and are sufficiently strong to prevent bending thereof by the animals utilizing the watering fountain and, as stated above, the spacing therebetween is sufficient to permit insertion of the mouth or head of the animal to a sufficient distance to allow comfortable drinking, but are insufficiently spaced to permit the introduction of any further part of the body.

The receptacle 10 of this invention may of course be supported directly upon the ground where use thereof by only small animals or fowl is contemplated, but in view of the fact that use thereof by larger animals, such as horses and cattle, would be relatively inconvenient, means has been provided to suitably support the receptacle 10 at a convenient distance above the ground and at the same time provide sufficient stability to prevent upsetting of the fountain and, consequently, damage thereto and the pipe connections leading to and from the same.

The supporting means, as shown in the drawings, comprises outwardly diverging legs 29 at each end of the receptacle. These legs are provided with upstanding portions 30 which may be secured to the side walls 11 of the receptacle 10 by screw-threaded fastening means 31 or by rivets, welding or any other suitable means. A cross brace 32 secured to the legs 29 by screw-threaded fastening means or the like 33 is provided immediately below the bottom wall 12 of the receptacle 10. This cross brace 32 is in contact with the bottom wall 12 to further assist in supporting the weight thereof and at the same time prevent spreading of the legs 29. As shown in the drawing the legs 29 and cross braces 32 are formed of angle iron stock, but obviously these might as well be formed of tubular stock or any other desired structural shapes, the angle iron construction, however, being preferable, since this material is readily available and contributes to a more economical device.

Since it is contemplated that the watering fountain of this invention will be utilized by smaller animals, such as sheep and goats as well as by various kinds of fowl, there has been provided a means for permitting these smaller animals and fowl to have convenient access to the water within the receptacle 10. For this purpose the cross braces 32 are extended outwardly beyond the legs 29, as shown at 34, and these extensions serve to support at each side of the receptacle 10 longitudinally extending bars 35 upon which fowl may perch while drinking from the receptacle 10 or upon which small animals, such as sheep and goats, may place their front feet in order to elevate themselves into a convenient position for drinking therefrom. Since the legs 29 are spread relatively widely apart, the lateral force exerted by the front feet of the animals on bars 35 will be insufficient to upset the fountain.

It will thus be seen that by the above described invention there has been provided a relatively simple and economical watering fountain which may be conveniently utilized by both large and small animals as well as by fowl of various types and in which the absence of sharp corners within the water-containing receptacle facilitates cleaning thereof and promotes sanitation. Likewise, a convenient overflow device has been provided which maintains the water level constant and which by a simple manipulation may be removed to permit draining of the contents. The entire device may be fabricated of galvanized or other rust-proof materials in order to prevent ageing or corrosion thereof and, likewise, the structure is such that little, if any, skilled labor is required in the fabrication thereof, thus materially contributing to low manufacturing costs.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A watering fountain comprising an elongated, open top trough-like receptacle having upstanding side walls and a bottom wall connected by inclined intermediate side walls and walls closing the ends of said receptacle, an outlet comprising a nipple secured to said bottom wall adjacent one end thereof and communicating with the interior of said receptacle, a drain pipe connected to said nipple, internal screw threads in the upper end of said nipple, an overflow pipe extending into said nipple and engaging said screw threads, said overflow pipe extending upwardly within said receptacle, the length of said overflow pipe determining the level of water in said receptacle and serving to maintain the same constant whereby upon removal of said overflow pipe the entire contents of said receptacle will drain therefrom, a guard for the open top of said receptacle comprising spaced, transverse, substantially parallel rods of generally inverted V-shape with downwardly extending substantially vertical legs, a longitudinally extending rod secured to the legs on each side of said guard to form a unitary structure, an overhanging lip on each upstanding side wall of said receptacle, apertures in said lip, certain of said legs being longer than the others and extending through said apertures, removable fastening means engaging said last-named legs below said lips to retain said guard in place and supporting means for said receptacle comprising spaced pairs of downwardly and outwardly diverging legs, upstanding portions on said legs secured to the upstanding side walls of said receptacle, cross braces secured to each pair of legs below said receptacle and engaging the bottom thereof to assist in supporting said receptacle, extensions on said cross braces outwardly of said legs and longitudinally extending bars carried by said extensions to provide a support for small animals or fowl whereby use of said fountain by large or small animals is facilitated.

2. A watering fountain comprising an elongated, open top, trough-like receptacle having upstanding side walls and a bottom wall connected by inclined intermediate side walls and walls closing the ends of said receptacle, an outlet comprising a nipple secured to said bottom wall adjacent one end thereof and communicating with the interior of said receptacle, a drain pipe connected to said nipple, an overflow pipe removably secured in said nipple, said overflow pipe extending upwardly within said receptacle, the length of said overflow pipe determining the level of water in said receptacle and serving to maintain the same constant whereby upon removal of said overflow pipe the entire contents of said receptacle will drain therefrom, a guard for the open top of said receptacle comprising spaced, transverse, substantially parallel rods of generally inverted V-shape with downwardly extending substantially vertical legs, a longitudinally extending rod secured to the legs on each side of said guard to form a unitary structure, an overhanging lip on each upstanding side wall of said receptacle, apertures in said lips, certain of said legs being longer than the others and extending through said apertures, removable fastening means engaging said last-named legs below said lips to retain said guard in place and supporting means for said receptacle comprising spaced pairs of downwardly and outwardly diverging legs, upstanding portions on said legs secured to the upstanding side walls of said receptacle, cross braces secured to each pair of legs below said receptacle and engaging the bottom thereof to assist in supporting said receptacle, extensions on said cross braces outwardly of said legs and longitudinally extending bars carried by said extensions to provide a support for small animals or fowl whereby use of said fountain by large or small animals is facilitated.

3. A watering fountain comprising an elongated, open top, trough-like receptacle having upstanding side walls and a bottom wall connected by inclined intermediate side walls and walls closing the ends of said receptacle, an outlet comprising a nipple secured to said bottom wall adjacent one end thereof and communicating with the interior of said receptacle, a drain pipe connected to said nipple, an overflow pipe removably secured in said nipple, said overflow pipe extending upwardly within said receptacle, the length of said overflow pipe determining the level of water in said receptacle and serving to maintain the same constant whereby upon removal of said overflow pipe the entire contents of said receptacle will drain therefrom, a guard for the open top of said receptacle comprising spaced, transverse rods with downwardly extending legs, a longitudinally extending rod secured to the legs on each side of said guard to form a unitary structure, an overhanging lip on each upstanding side wall of said receptacle, apertures in said lips, certain of said legs being longer than the others and extending through said apertures, removable fastening means engaging said last-named legs below said lips to retain said guard in place and supporting means for said receptacle comprising spaced pairs of downwardly and outwardly diverging legs, upstanding portions on said legs secured to the upstanding side walls of said receptacle, cross braces secured to each pair of legs below said receptacle and engaging the bottom thereof to assist in supporting said receptacle, extensions on said cross braces outwardly of said legs and longitudinally extending bars carried by said extensions to provide a support for small animals or fowl whereby use of said fountain by large or small animals is facilitated.

4. A watering fountain comprising an elongated, open top, troughlike receptacle having upstanding side walls and a bottom wall connected by inclined intermediate side walls and walls closing the ends of said receptacle, an outlet comprising a nipple secured to said bottom wall adjacent one end thereof and communicating with the interior of said receptacle, a drain pipe connected to said nipple, internal screw threads in the upper end of said nipple, an overflow pipe extending into said nipple and engaging said screw threads, said overflow pipe extending upwardly within said receptacle, the length of said overflow pipe determining the level of water in said receptacle and serving to maintain the same constant whereby upon removal of said overflow pipe the entire contents of said receptacle will drain therefrom, a guard for the open top of said receptacle comprising spaced, transverse, substantially parallel rods of generally inverted V-shape with downwardly extending substantially vertical legs, a longitudinally extending rod secured to the legs on each side of said guard to form a unitary structure, an over hanging lip on each upstanding side wall of said receptacle, apertures in said lips, certain of said legs being longer than the others and extending through said apertures and removable fastening means engaging said last-named legs below said lips to retain said guard in place.

5. A watering fountain comprising an elongated, open top, troughlike receptacle having upstanding side walls and a bottom wall connected by inclined intermediate side walls and walls closing the ends of said receptacle, an outlet comprising a nipple secured to said bottom wall adjacent one end thereof and communicating with the interior of said receptacle, an overflow pipe removably secured in said nipple, said overflow pipe extending upwardly in said receptacle, the length of said overflow pipe determining the level of water in said receptacle and serving to maintain the same constant whereby upon removal of said overflow pipe the entire contents of said receptacle will drain therefrom, a guard for the open top of said receptacle comprising spaced, transverse, substantially parallel rods of generally inverted V-shape with downwardly extending substantially vertical legs, a longitudinally extending rod secured to the legs on each side of said guard to form a unitary structure, an overhanging lip on each upstanding side wall of said receptacle, apertures in said lips, certain of said legs being longer than the others and extending through said apertures and removable fastening means engaging said last-named legs below said lips to retain said guard in place.

6. A watering fountain comprising an elongated, open top, troughlike receptacle having upstanding side walls and a bottom wall connected by inclined intermediate side walls and walls closing the ends of said receptacle, an outlet comprising a nipple secured to said bottom wall adjacent one end thereof and communicating with the interior of said receptacle, an overflow pipe removably secured in said nipple, said overflow pipe extending upwardly within said receptacle, the length of said overflow pipe determining the level of water in said receptacle and serving to maintain the same constant whereby upon removal of said overflow pipe the entire contents of said receptacle will drain therefrom, a unitary guard for the open top of said receptacle comprising spaced, transverse, substantially parallel rods with downwardly extending substantially vertical legs, an over hanging lip on each upstanding side wall of said receptacle, apertures in said lips, certain of said legs being longer than the others and extending through said apertures and removable fastening means engaging said last-named legs below said lips to retain said guard in place.

7. A watering device for animals and poultry comprising an open top trough-like receptacle, a lip projecting laterally from the top of each of the longitudinal walls of the receptacle to provide a supporting structure for a guard, a guard for said receptacle including a plurality of inverted V-shaped members arranged in spaced generally parallel relation with the ends of the opposed legs of each V-shaped member being spaced approximately the distance between the opposite lips of the receptacle, a first rod secured to one leg of each guard member, a second rod secured to the other leg of each guard member, said rods serving to maintain the guard members in operative relation to one another, some of the legs of some of the guard members having portions projecting below the said rods, said lips having apertures registering with said projecting portions for receiving said projecting portions for maintaining the guard in operative position, and means to support the receptacle in operative position.

8. A watering device for animals and poultry comprising an open top trough-like receptacle, a lip projecting laterally from the top of each of the longitudinal walls of the receptacle to provide a supporting structure for a guard, a guard for said receptacle including a plurality of inverted V-shaped members arranged in spaced generally parallel relation with the ends of the opposed legs of each V-shaped member being spaced approximately the distance between the opposite lips of the receptacle, a first rod secured to one leg of each guard member, a second rod secured to the other leg of each guard member, said rods serving to maintain the guard members in operative relation to one another, some of the legs of some of the guard members having portions projecting below the said rods, said lips having apertures registering with said projecting portions for receiving said projecting portions for maintaining the guard in operative position, means to support the receptacle in operative position, at least some of the projecting portions of the legs having transverse apertures therethrough spaced from the adjacent rod, and pin members passing through said transverse apertures on the lower side of the lips for maintaining the guard in fixed position.

9. A watering device for animals and poultry comprising an open top trough-like receptacle, a lip projecting laterally from the top of each of the longitudinal walls of the receptacle to provide a supporting structure for a guard, a guard for said receptacle including a plurality of inverted V-shaped members arranged in spaced generally parallel relation with the ends of the opposed legs of each V-shaped member being spaced approximately the distance between the opposite lips of the receptacle, a first rod secured to one leg of each guard member, a second rod secured to the other leg of each guard member, said rods serving to maintain the guard members in operative relation to one another, some of the legs of some of the guard members having portions projecting below the said rods, said lips having apertures registering with said projecting portions for receiving said projecting portions for maintaining the guard in operative position, means to support the receptacle in operative position, at least some of the projecting portions of the legs having transverse apertures extending therethrough and spaced from the adjacent rod in the plane of its V-shaped guard member, said receptacle having apertures registering with said transverse apertures, and pins in said transverse apertures below said lips for fixing said guard in operative position.

10. A watering device for animals and poultry comprising an open top trough-like receptacle, means projecting laterally from the top of each of the longitudinal walls of the receptacle to provide a supporting structure for a guard, a guard for said receptacle including a plurality of arched members arranged in spaced generally parallel relation with the ends of the opposed legs of each arched member spaced approximately the distance between said laterally projecting means along the top of each of said longitudinal walls, a connection between the legs of said guard members adjacent each of the ends of the same and serving to maintain said guard members in operative relation one to the other, some of the legs of the guard members having portions projecting below said means projecting laterally, said laterally projecting means engaging said projecting portions and maintaining said guard in operative position, and means to support said receptacle in operative position.

References Cited in the file of this patent

UNITED STATES PATENTS

| Number | Name | Date |
|---|---|---|
| 904,539 | Koenig | Nov. 24, 1908 |
| 1,252,861 | Terstegge | Jan. 8, 1918 |
| 1,632,738 | Lord | June 14, 1927 |
| 1,642,304 | Lantz | Sept. 13, 1927 |
| 1,650,965 | Seikman | Nov. 29, 1927 |
| 1,652,665 | Frick | Dec. 13, 1927 |
| 1,664,691 | Langewisch | Apr. 3, 1928 |
| 1,741,083 | Tucker | Dec. 24, 1929 |
| 1,786,024 | Olson | Dec. 23, 1930 |
| 1,811,375 | Wysong | June 23, 1931 |
| 1,830,689 | Badenhop | Nov. 3, 1931 |
| 1,883,631 | Dunlevy | Oct. 18, 1932 |
| 1,887,681 | Harris | Nov. 15, 1932 |
| 1,956,524 | Byram | Apr. 24, 1934 |
| 2,254,585 | Travis | Sept. 2, 1941 |
| 2,278,047 | Van Fleet | Mar. 31, 1942 |
| 2,347,418 | Kravick | Apr. 25, 1944 |
| 2,433,912 | Keagle | Jan. 6, 1948 |
| 2,452,237 | Hoburg et al. | Oct. 26, 1948 |
| 2,486,301 | Linington | Oct. 25, 1949 |